US010093336B2

(12) United States Patent
Pan et al.

(10) Patent No.: US 10,093,336 B2
(45) Date of Patent: Oct. 9, 2018

(54) ELECTRIC PULLET TRUCK

(71) Applicant: Ningbo Ruyi Joint Stock Co., Ltd., Ningbo, Zhejiang Province (CN)

(72) Inventors: Zhenyu Pan, Ningbo (CN); Zhenli Feng, Ningbo (CN); Ji Chen, Ningbo (CN); Feng Tian, Ningbo (CN)

(73) Assignee: Ningbo Ruyi Joint Stock Co., Ltd., Ningbo (CN)

( * ) Notice: Subject to any disclaimer, the term of this patent is extended or adjusted under 35 U.S.C. 154(b) by 26 days.

(21) Appl. No.: 15/281,320

(22) Filed: Sep. 30, 2016

(65) Prior Publication Data

US 2017/0120941 A1    May 4, 2017

(30) Foreign Application Priority Data

Oct. 30, 2015   (CN) ................. 2015 2 0868303 U
Feb. 29, 2016   (CN) ..................... 2016 1 0110945
(Continued)

(51) Int. Cl.
*B62B 5/00*     (2006.01)
*B62B 3/06*     (2006.01)
(Continued)

(52) U.S. Cl.
CPC ............ *B62B 5/0043* (2013.01); *B62B 3/001* (2013.01); *B62B 3/0612* (2013.01); *B62B 5/0053* (2013.01); *B62B 5/06* (2013.01)

(58) Field of Classification Search
CPC ......... B62B 3/001; B62B 3/0612; B62B 5/06; B62B 5/0043; B62B 5/0053
(Continued)

(56) References Cited

U.S. PATENT DOCUMENTS 3,036,651  A  *  5/1962  Paul ...................... B62B 3/0612
                                                          180/19.2
4,615,533  A  *  10/1986  Sewell ................. B62B 3/0618
                                                          280/43.12
(Continued)

FOREIGN PATENT DOCUMENTS

CN    101214823  A    7/2008
CN    102515056  A    6/2012
JP    2005089037  A    4/2005

*Primary Examiner* — Anne Marie M Boehler
*Assistant Examiner* — Felicia L. Brittman
(74) *Attorney, Agent, or Firm* — NK Patent Law

(57) ABSTRACT

The present invention provides an electric pullet truck in the technical field of land transportation equipment. The electric pullet truck comprises a frame including two forks; a steering drive assembly including i) a drive wheel component disposed behind the frame; ii) an oil cylinder component to drive the forks up, which includes a cylinder body and a plunger which could telescopically move within the cylinder body, wherein the cylinder body is fixedly connected with the drive wheel component; iii) a supporting seat component including an annular sleeve and two support arms extending from both sides of the annular sleeve, wherein the annular sleeve is covered outside of a lower portion of the oil cylinder body; and iv) a handle seat component fixedly connected with an upper portion of the cylinder body. The electric pullet truck of the invention has advantages like a high degree of integration and smooth steering.

18 Claims, 8 Drawing Sheets

(30) Foreign Application Priority Data

Feb. 29, 2016 (CN) .......................... 2016 1 0111116
Feb. 29, 2016 (CN) .......................... 2016 1 0111911

(51) Int. Cl.
*B62B 5/06* (2006.01)
*B62B 3/00* (2006.01)

(58) Field of Classification Search
USPC ........................................................ 180/252
See application file for complete search history.

(56) References Cited

U.S. PATENT DOCUMENTS

| | | |
|---|---|---|
| 6,343,907 B1 | 2/2002 | Schalmath |
| 8,540,213 B2 | 9/2013 | Feiquan et al. |
| 8,833,736 B2 | 9/2014 | Feiquan et al. |
| 9,079,754 B2 | 7/2015 | Feiquan et al. |
| 2016/0023872 A1* | 1/2016 | Liu ....................... B62B 3/0612 254/2 R |

* cited by examiner

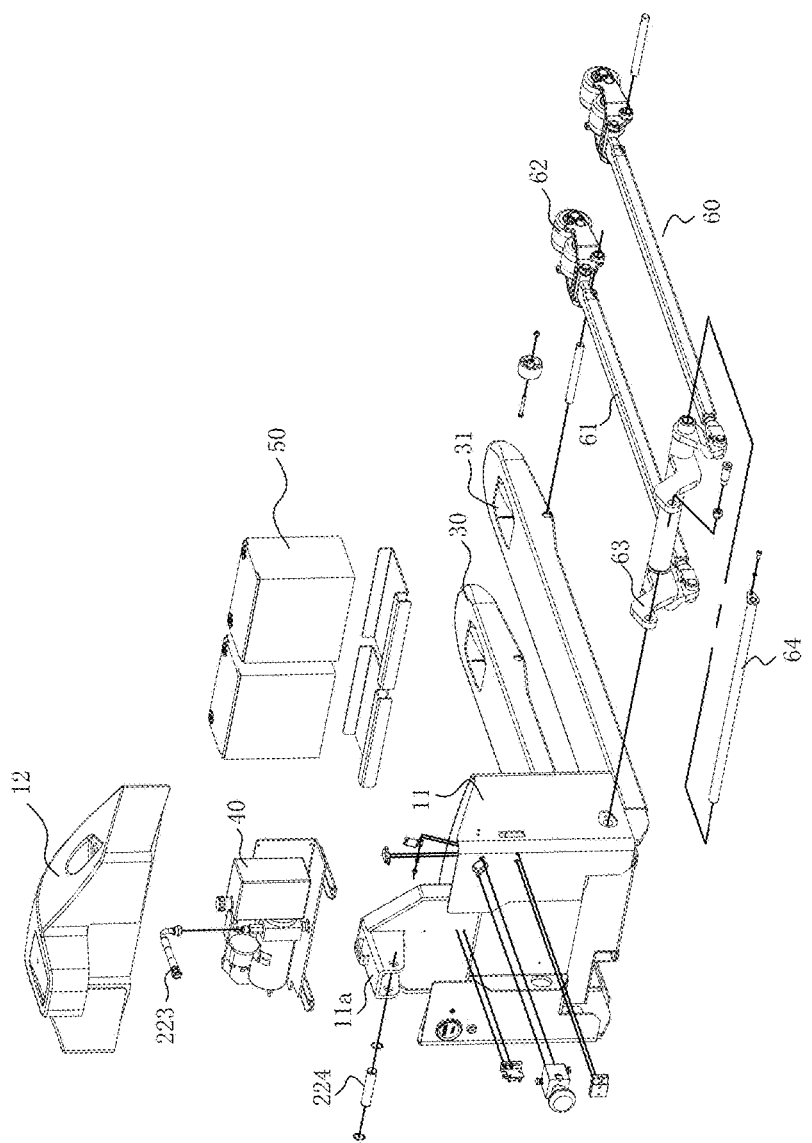
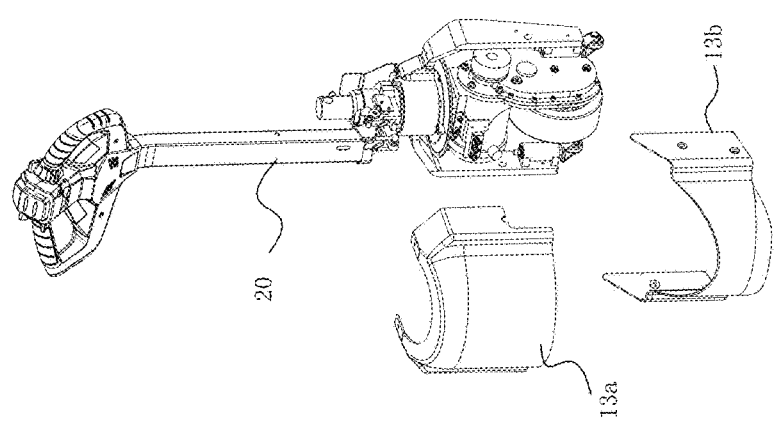
Fig 1

ELECTRIC PULLET TRUCK

CROSS-REFERENCE TO RELATED APPLICATIONS

This application claims priority to Chinese Patent Application No. 201520868303.5 filed on Oct. 30, 2015 and to Chinese Patent Applications No. 201610111116.1, No. 201610111911.0, and No. 201610110945.8, all three filed on Feb. 29, 2016, the disclosures of which are incorporated herein by reference in their entirety.

BACKGROUND OF THE INVENTION

Field of Invention

The present invention relates to an electric pullet truck in the technical field of land transportation equipment.

Related Art

With rapid development of modern industry, the transportation of warehouse stocks has been transited from manpower transportation to electric transportation. However in current market of warehouse stocks, the manpower pullet truck still takes an extremely large market share. The factor restricting this replacement is mainly the size and price of the electric pullet truck. The manpower pullet trucks generally have a small size and a low price, while the electric pullet trucks usually have a larger size for requiring a drive mechanism like a motor and an oil cylinder.

U.S. Pat. No. 9,079,754B discloses an electric pullet truck having a drive wheel at the back of a fork. A drive motor is provided on the drive wheel. The electric pullet truck further comprises a steering seat the upper portion of which is fixedly connected with the oil cylinder body, and the lower portion of which is connected with the drive wheel. The drive wheel is directly driven by a handle in the process of rotation. In this patent, the entire height of the electric the drive steering mechanism at the back of the electric pullet truck includes an oil cylinder height, a height of the steering seat composed of upper a lower connecting portions, and a drive wheel height. In the drive wheel, the motor and the wheel are coaxially disposed and a poor working condition is resulted. If the drive wheel is disposed along a parallel axis, the entire height of the electric the drive steering mechanism at the back of the electric pullet truck is increased and the entire center of gravity of the electric pullet truck moves up accordingly, which further disadvantageously affects integration and steering stability of the electric pullet truck.

SUMMARY OF THE INVENTION

It is therefore an object of the present invention to provide an electric pullet truck with a high degree of integration and good steering stability, thereby addressing the problems existing in the prior art.

The present invention provides an electric pullet truck, comprising:
 a frame including two forks;
 a steering drive assembly including
 a drive wheel component disposed behind the frame;
 an oil cylinder component to drive the forks up, which includes a cylinder body and a plunger which could telescopically move within the cylinder body, wherein the cylinder body is fixedly connected with the drive wheel component;
 a supporting seat component including an annular sleeve and two support arms extending from both sides of the annular sleeve, wherein the annular sleeve covers an outside of a lower portion of the cylinder body; and
 a handle seat component fixedly connected with an upper portion of the oil cylinder component.

Furthermore, the frame further includes a front casing vertical to the forks, an upper cover provided on the front casing and a back housing assembly enclosing a back of the steering drive assembly.

Furthermore, the electric pullet truck further includes a vehicle control assembly which is mounted within the space enclosed by the front casing and the upper cover.

Furthermore, the said two support arms are located on both sides of the drive wheel component.

Furthermore, each of the said two support arms is provided with an equilibrium wheel at its bottom.

Furthermore, a support sleeve is provided on an inner side of a bottom of each of the said two support arms, a universal wheel stand is provided within the support sleeve, the universal wheel stand is coupled with a bearing and a spring on its upper side and the equilibrium wheel is provided below the universal wheel stand.

Furthermore, the drive wheel component includes a drive wheel and a drive motor, the drive motor is fixedly connected with a lower part of the cylinder body, and the drive motor is provided above the drive wheel.

Furthermore, the drive motor is integrally provided with a first mounting panel drive motor at its upper portion and with a second mounting panel at its lower portion, and the first mounting panel and the second mounting panel are flatly connected with and fixed to each other.

Furthermore, the drive wheel is vertically disposed, the drive motor is horizontally provided above the drive wheel along its central axis, and a central line of the drive motor in the vertical direction is close to or overlapped with that of the drive wheel in the vertical direction.

Furthermore, a bearing component and a retainer ring are further provided between the annular sleeve and the cylinder body, so that the cylinder body could rotate within the annular sleeve.

Furthermore, the central axis of the oil cylinder component is overlapped with that of the drive wheel.

Furthermore, an oil pipe connecting port is provided at an upper end of the plunger, and the oil pipe connecting port is in communication with the vehicle control assembly via the oil pipe.

Furthermore, the electric pullet truck further includes an annular baffle provided below the annular sleeve and the diameter of the annular baffle is larger than that of the annular sleeve to cover the drive wheel component.

Furthermore, a battery unit port is provided on a surface of the frame, a vehicle control assembly is mounted at an upper part of the frame, the electric pullet truck further comprises:
 a battery unit component provided within the frame and below the vehicle control assembly, wherein the battery unit component includes at least one battery unit; and
 a cover plate removably mounted on a surface of the frame to seal the battery unit port, wherein the cover plate is located in front of the battery unit component, and the battery unit could be directly taken out from the battery unit port when the cover plate is opened.

Furthermore, a lower end of the vehicle control assembly is pressed against the battery unit component to press each battery unit within the frame tightly.

Furthermore, the frame includes a frame enclosure, the vehicle control assembly is tightly inserted at an upper portion of the frame enclosure, the battery unit component is tightly provided at a lower portion of the frame enclosure, the battery unit is entirely wrapped by the frame enclosure, and the battery unit port is located on a surface of the frame enclosure.

Furthermore, a casing is provided on the frame enclosure to enclose the vehicle control assembly, and the casing, cover plate and frame enclosure are closely adjacent to form a sealed space.

Furthermore, a lower edge of the casing is embedded into an area enclosed by the frame enclosure and the cover plate together, and an outer sidewall of the embedding part of the casing is pressed against a corresponding inner wall of the frame enclosure and cover plate.

Furthermore, an upper edge of the cover plate is in an arc shape and an inner wall of this arc-shape structure is pressed against an outer wall of the casing.

Furthermore, both sides of the cover plate are bent to form hemming, and each of the hemmings is tightly mounted on the inner side of the frame enclosure.

Furthermore, two battery units are provided for the battery unit component, the upper end faces of the said two battery units are flush with each other, and the said two battery units are both pressed within the frame by the vehicle control assembly.

Furthermore, the lower part of the frame enclosure is preferably provided with housing slots corresponding to the battery units respectively, and a separation plate is located between every two adjacent battery units, and the separation plate is integrated with the frame enclosure.

Furthermore, the upper end of the separation plate is provided with a notch at the corner adjacent to the cover plate.

Thanks to the technical solutions mentioned above, the embodiments of the invention could achieve the technical effect as follows. In the process of rotation, the handle seat drives the oil cylinder to turn directly, and the oil cylinder drives the drive wheel component fixedly connected thereto to turn, thereby achieving the steering function. The oil cylinder component rotates within the annular sleeve of the supporting seat. The entire height of the steering drive assembly includes the height of the oil cylinder body and that of drive component only, so that the center of gravity of the pullet truck is lowered, and the pullet truck has smoother steering and a higher degree of integration, and thus a better operation performance. The support arms of the support seat are provided with equilibrium wheels at the bottom to make steering of the pullet truck further smooth and reliable. The drive motor is located above the drive wheel along the central axis, thereby increasing height of the drive motor above the ground, better preventing the dust entering into the motor and providing convenient maintenance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein:

FIG. 1 is an exploded view of the electric pullet truck according to one preferred embodiment of the invention;

DETAILED DESCRIPTION OF THE INVENTION

Embodiments of the invention will be described below in connection with the accompanying figures, to further illustrate the technical solution of the patent. However, the invention is not limited to these embodiments.

Figure 2:
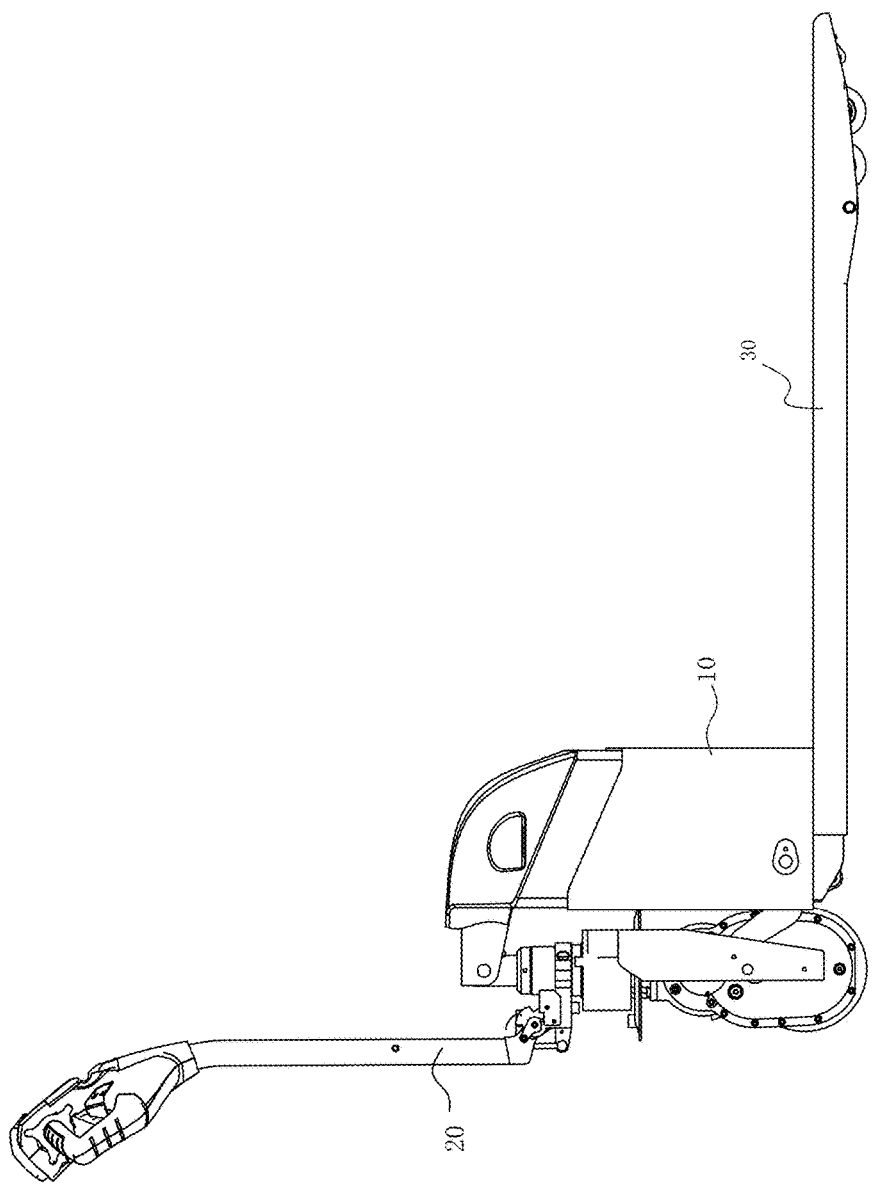
FIG. 2 is a side view of the electric pullet truck according to one preferred embodiment of the invention.
Figure 3:
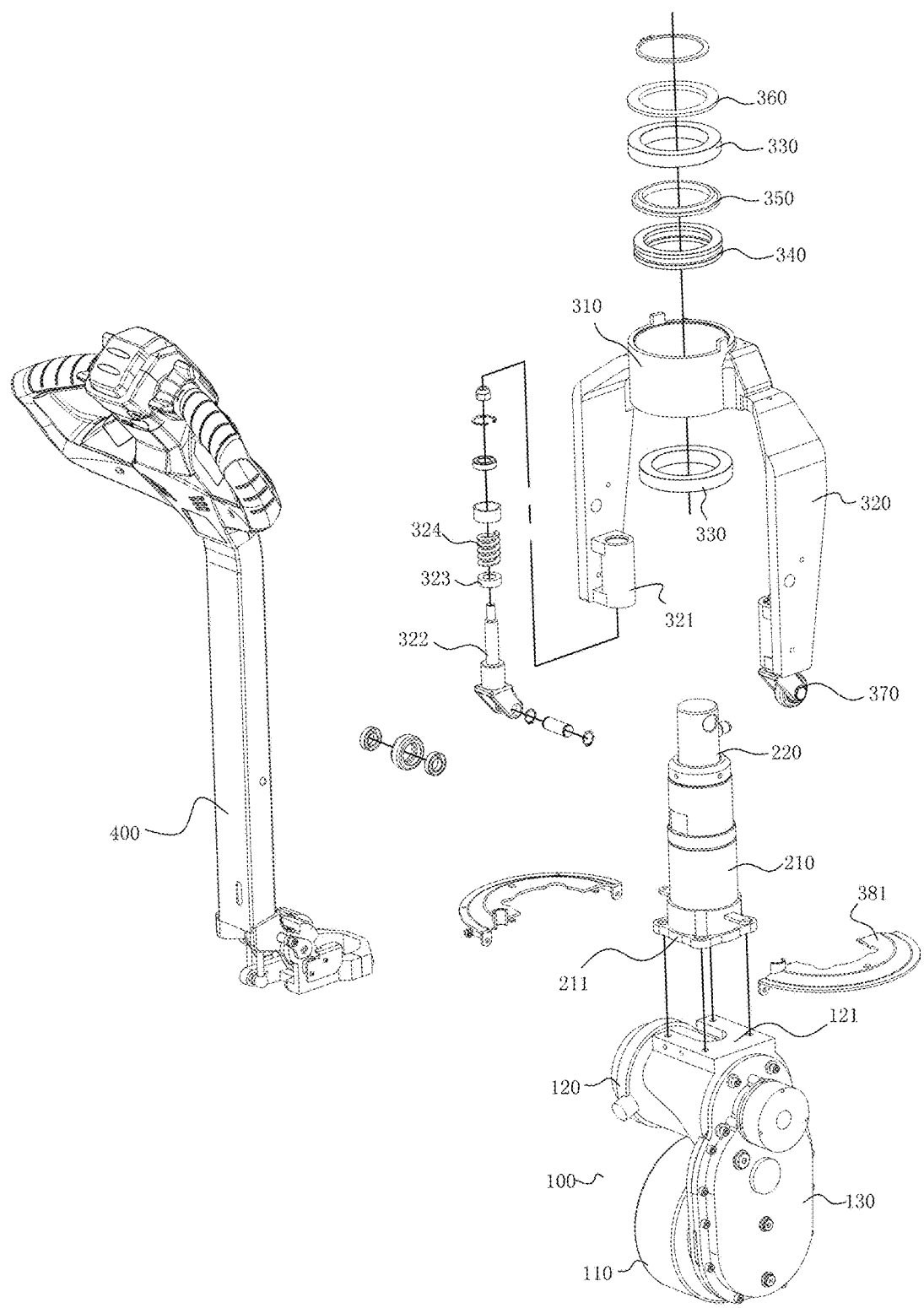
FIG. 3 is a an exploded view of the steering drive assembly according to one preferred embodiment of the invention.

With reference to FIGS. 1-3, in a preferred embodiment of the invention, an electric pullet truck includes a frame 10, a steering drive assembly 20 provided behind the frame and two forks 30 provided in front of the frame.

The frame 10 is comprised of a front casing 11 vertical to the forks 30, an upper cover 12 provided on the front casing 11 and a back housing assembly enclosing the back of the steering drive assembly 20. The upper cover 12 is disposed on the front casing 11.

The back housing assembly is composed of a back cover 13a and a back panel 13b. Both the back cover 13 and the back panel 13b are in an arc shape, and are connected with the sides of the front casing 11 to form a housing space. The lower part of the steering drive assembly 20 is located within the housing space.

A vehicle control assembly 40 and a storage battery element 50 are further provided within the housing space formed by the front casing 11 and the upper cover 12. The vehicle control assembly 40 supplies high-pressure oil to the steering drive assembly to make the steering drive assembly drive the forks up and down. The storage battery element 50 supplies power to the steering drive assembly to make the steering drive assembly drive the electric pullet truck back and forth.

The forks 30 are connected with the front casing 11 via a connecting rod rocker assembly 60. The connecting rod rocker assembly 60 includes two connecting rods 61 which are disposed under two forks 30 respectively. A roller 62 is provided at the end of each connecting rod 61. A roll groove 31 is provided at each of the forks 30 corresponding to the roller 62, so that the roller 62 could roll within the roll groove 31. A rocker 63 is provided at the front end of each connecting rod 61. And these two rockers 63 are connected with each other through a connecting shaft 64. The rockers 63 are respectively swayably connected to the front ends of the connecting rods 61. The front ends of two rockers 63 are respectively connected with left and right sidewalls of the front casing 11.

The front casing 11 is further provided with a connecting element 11a projecting to the back of the frame, so as to be connected with the steering drive assembly 20.

The specific configuration of the steering drive assembly of the electric pullet truck will be described in detail below.

Figure 4:
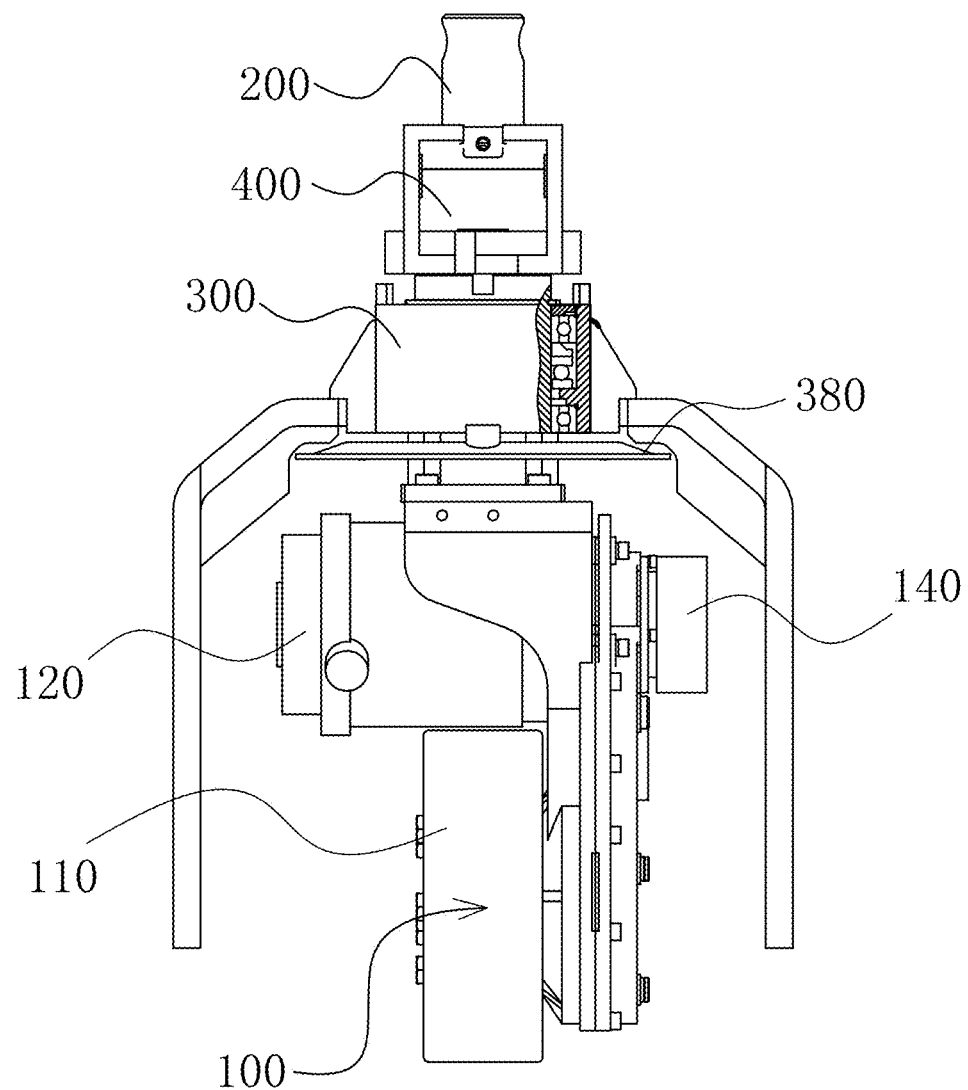
FIG. 4 is a diagram of the steering drive assembly according to one preferred embodiment of the invention.
Figure 5:
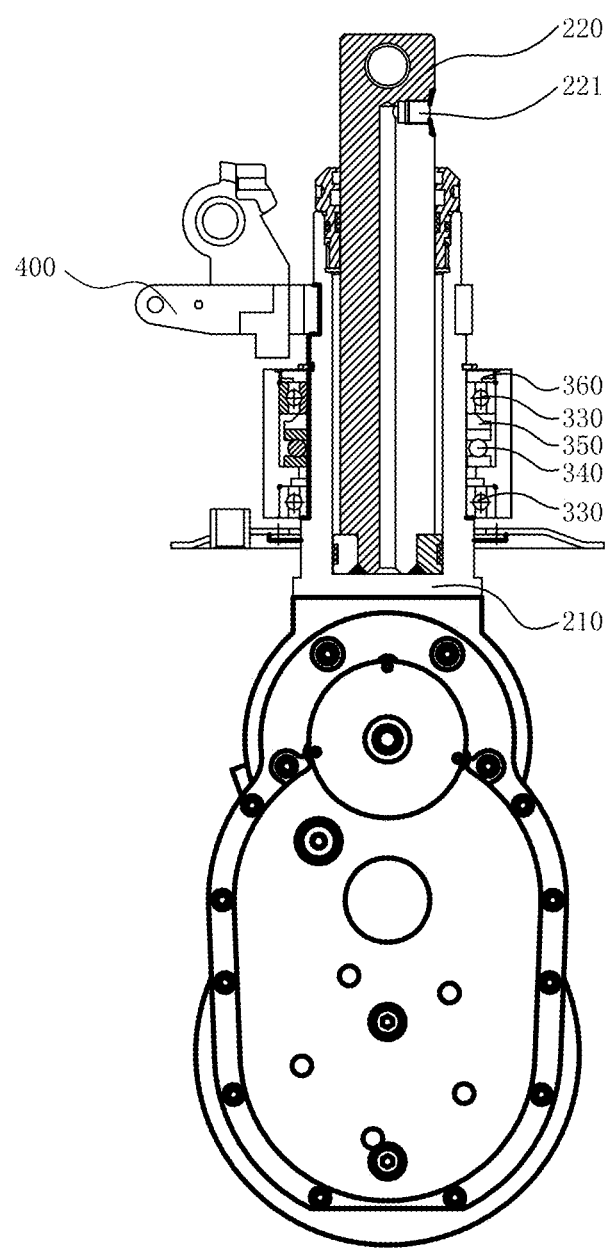
FIG. 5 is a section view of the steering drive assembly according to one preferred embodiment of the invention.

Referring to FIGS. 3-5, the steering drive assembly of the electric pullet truck includes a drive wheel component 100, an oil cylinder component 200, a supporting seat component 300 and a handle seat component 400. The oil cylinder component 200 is fixedly connected with the drive wheel component 100. The handle seat component 400 is fixedly connected with the oil cylinder component 200. The oil cylinder component 200 could rotate within the supporting seat component 300.

In steering, the handle seat component 400 drives the oil cylinder component 200 to rotate in the supporting seat component 300, and drives the drive wheel component 100 to turn thereby achieving steering.

In the invention, the drive wheel component 100 is integrally and rotably mounted behind the frame 10, and includes a drive wheel 110 and a drive motor 120. In this embodiment, the drive motor 120 is disposed above the drive wheel 110 and transmits the power to the drive wheel through a gear transmission mechanism 130. When the drive motor 120 is powered on, the drive wheel 110 is driven to move, and forward and backward rotations of the drive motor 120 drive the drive wheel 110 to move forward and backward.

In this invention, the frame 10 is used as a mounting base for various components of the electric pullet truck and a carrying base for warehouse stocks. The components like forks and traction bracket could be mounted in front of the frame, mainly for transporting articles. The drive wheel component 100 is used as a drive power source and provided behind the frame 10, which improves reasonableness of spatial layout. The handle seat component 400 is controlled to drive the drive wheel component 100 to move, thereby driving the electric pullet truck to move or steer.

In the configuration of the drive wheel component 100 of the electric pullet truck, the drive motor is provided above the drive wheel along the central axis (when the pullet truck sways in the horizontal plane, the upper and low workplaces are pointed to a vertical orientation), which not only increases the height of the drive motor above the ground, i.e., increases the latitude of the motor, reduces the likelihood of small-particle impurities entering into the drive motor and safeguards reliability of operation of the motor and entire stability of operation of the drive wheel component, but also provides the drive motor with convenience in maintenance and replacement.

Compared to the conventional electric pullet trucks in which the motor is fixed to the drive wheel or the motor is placed on the side of the drive wheel, the drive motor is disposed separate from the drive wheel in the invention. To this end, the components could be more conveniently mounted, replaced or maintained. A single component could be easily maintained and replaced in maintenance, and there is no need to replace or maintain the entire drive wheel component, which saves time and labor and improves highly efficient operation of the plant.

Additionally, in the conventional configuration in which the motor is placed on the side of the drive wheel, the center of gravity of the drive wheel component laterally displaces along the horizontal direction, and the an axial pull force is produced on the drive wheel when a too large traction is output by the motor to the drive wheel. In this case, one end of the drive wheel away from the motor is tilted up, resulting in certain impendence of the drive wheel at this position and further decreasing stability of the pullet truck in movement and steering.

On the other hand, the motor is disposed above the drive wheel along the central axis, not only overcoming stability defects resulted from the lateral location of the motor relative to the drive wheel, but also returning the entire center of gravity of the drive wheel component to a position close to the vertical direction of the drive wheel. This said, the drive wheel moves and turns more stably and does not tend to tilt up or impend.

Further, the drive wheel component 100 is configured in such a manner that the axial stress or tension exerted on the drive wheel in the lateral direction (horizontal direction) is reduced, the interference resulted by the traction produced by the drive motor is reduced, and the movement and steering of the drive wheel component is more stable.

In a preferred or optional embodiment, in order for the drive motor 120 to cooperate with the drive wheel 110 more intimately, to reduce interference among the components and to make operation of the drive wheel component stable, a gap is preferably provided between the outer sidewall of the drive motor and the drive wheel as shown in FIGS. 3 and 4. Moreover, the gap is relatively small to make the spatial configuration more compact. And as viewed in the vertical direction, the gap is the one between the outer sidewall in the middle of the drive motor and the outer wall of the drive wheel, i.e., the shorted gap therebetween.

In this patent, the drive wheel 110 is preferably vertically disposed to make the pullet truck move quickly and stably, for which the friction between the drive wheel and the ground is rolling friction. The drive motor 120 is disposed horizontally above the drive wheel 110. Such a T-shape configuration of the drive wheel component 100 provides a more reliable structure, a stable center of gravity in the process of movement and stable drive force output of the motor, which guarantees entire stability of motion of the pullet truck, particularly in the linear direction.

The gear transmission mechanism 130 preferably has one end fixedly connected with the housing of the drive motor 120 to provide structural reliability, and the other end connected with the central axis of the drive wheel 110, thereby providing a simple configuration. The motor transmits power to the drive wheel 110 via the gear transmission mechanism 130 and the power transmission between the motor and the drive wheel is reliable.

More preferably, in order to conveniently brake the drive wheel component 100, the drive wheel component 100 further includes a brake 140 mounted outside of the gear transmission mechanism 130. The motor has a rotation shaft and the rotation shaft is connected with the drive wheel. The brake 140 has a brake pad and the brake pad is connected with the rotation shaft via a flat key.

In this invention, the drive wheel component is used to provide moving power for the pullet truck, and the brake is to provide the braking force against movement of the pullet truck to stop and park the truck. The brake is configured in a reasonable manner and provides reliable brake, which achieves a braking function required for movement and stop of the pullet truck.

Still further, the drive motor in this invention preferably drives the drive wheel to move forward and backward through switches between clockwise and anticlockwise rotations. The said drive wheel component works in such a way that, the drive wheel is driven to bring movement of the frame (i.e., the whole pullet truck) when the drive motor is powered on, and the forward and backward movement is achieved through switches between clockwise and anticlockwise rotations of the motor rotation shaft, and the drive wheel will stop after the brake is operated, thereby achieving the braking function of the pullet truck.

In this invention, in order to provide a more stable operation of the drive motor 120 and the drive wheel 110, the central line of the drive motor in the vertical direction is close to or overlapped with that of the drive wheel in the vertical direction. That is to say, the center of gravity of the drive motor is close to or substantially overlapped with or overlapped with that of the drive wheel as viewed from top. The axial stress interference between the drive motor and the drive wheel in movement will be reduced. The back of the entire frame will not easily tilt and the pullet truck could be moved stably with a reliable friction with the ground.

In order to make the configuration behind the frame more compact and reliable, an oil cylinder component 200 is provided behind the frame to move the frame up and down. The oil cylinder component 200 includes a cylinder body 210 and a plunger 220 which could move telescopically within the cylinder body 210. The upper portion of the cylinder body 210 is fixedly connected with the handle seat component 400, the lower portion of the cylinder body 210 is fixedly connected with the drive motor 120, and the central portion of the cylinder body is rotably mounted behind the frame. The plunger 220 is connected with the plunger 220.

In brief, the oil cylinder 210 is movably mounted on the frame 10 and both ends of the cylinder are respectively fixed to the handle seat component 400 and the drive motor 120. The drive motor together with the entire drive wheel component 100 is fixedly connected with the lower portion of the oil cylinder 210. When the handle seat component is driven to turn by a predetermined angle, the entire drive wheel component is turned, which provides convenient operation and stable movement.

In order for the drive motor to be fixed to the cylinder body more firmly and to guarantee connection reliability, the drive motor is preferably integrally provided with a first mounting panel 121 at its upper portion and with a second mounting panel 211 at its lower portion. The first mounting panel 121 and the second mounting panel 211 are flatly connected with and fixed to each other.

Furthermore, the first mounting panel 121 is at a lower position, the second mounting panel 211 is at an upper position, and the thickness of the first mounting panel 121 is larger than that of the second mounting panel 211. Therefore, the drive motor could be connected with the cylinder body more firmly, reliably and stably, which provides more smooth drive force transmission of the handle seat component and more stable movement of the entire pullet truck.

An oil pipe connecting port 221 and a connecting groove 222 are provided at the top of the plunger. The oil pipe connecting port 223 is in liquid communication with the vehicle control assembly 40. The connecting groove 222 is fixedly connected with the connecting element 11a. When the vehicle control assembly 40 supplies pressure oil into the oil cylinder, the plunger 220 extends out to move the frame up, and when the pressure oil is returned, the plunger automatically retracts for the weight of the frame, and thus the electric pullet truck is lowered.

The axis of the oil cylinder component is overlapped with that of the drive wheel in the vertical direction, so that the external force on the upper end of the oil cylinder component is directly transferred to the drive wheel component, without producing an additional moment.

In this embodiment, the bottom of the cylinder body 210 is fixedly connected with the top of the drive motor 120 via bolts.

In this invention, the supporting seat component 300 includes an annular sleeve 310 and two support arms 320 extending from both sides of the annular sleeve, which provides more stable movement of the entire pullet truck and reliable fixed mounting of various parts. In the process of mounting, the annular sleeve 310 is covered outside of the lower portion of the oil cylinder body 210. Two support arms 320 are respectively provided on both sides of the drive wheel component. As the annular sleeve 310 is covered outside of the lower portion of the oil cylinder body 210, the own height of the annular sleeve will not affect the entire height of the steering drive mechanism.

Each support arm 320 is fixedly connected with the frame 10 respectively. The annular sleeve is covered outside of the cylinder body 210 and rotably connected with the cylinder body. The drive wheel component is located below the annular sleeve. The supporting seat component is configured in such a manner that position limiting and fixing effects could be achieved. A universal joint roller is preferably provided at the end of the support arm, to provide more stable steering and movement.

In order for the oil cylinder body 210 to rotate within the annular sleeve 310, a bearing component and a retainer ring are provided between the oil cylinder body and the annular sleeve. In particular, the bearing component includes two deep groove ball bearings 330 located at an upper position and a lower position respectively, and a unidirectional thrust ball bearing 340 located between these two deep groove ball bearings. The retainer ring is also provided between two deep groove ball bearings.

A dust cap 360 is further provided above the upper deep groove ball bearing to prevent dust entering into the bearing to reduce the use life. An assistant ring is provided on the upper surface of the dust cap.

Two support arms 320 extend outward and downward from the outer sidewall of the oil cylinder body 210, to form a substantially U-shape. The bottom of two support arms 320 is in contact with the ground to take a support function. The bottom of the support arms could be configured not to be in direct contact with the ground.

In a preferred embodiment, two support arms are further provided with an equilibrium structure at the bottom. The equilibrium structure is preferably an equilibrium wheel 370, to provide the electric pullet truck with a better steering effect.

Particularly, a support sleeve 321 is provided on the inner side of the bottom of two support arms 320. A universal wheel stand 322 is mounted within the support sleeve 321. The universal wheel stand 322 is coupled with a bearing 323 and a spring 324. The equilibrium wheel 370 is provided below the universal wheel stand 322.

When the drive wheel is turned or moved, the equilibrium could provide a better body balance of the electric pullet truck and a more stable body.

In a preferred embodiment, the invention further comprises an annular baffle 380 provided below the annular sleeve. The annular baffle 380 has a diameter larger than that of the annular sleeve and slightly smaller than the gap between two support arms. As such, the annular baffle 380 could cover the drive wheel component. As viewed from top, the drive wheel component, the drive wheel component is not directly invisible, has a more aesthetic appearance, and could prevent the dust entering into the drive wheel component.

In this embodiment, the annular baffle 380 is composed of two half-circle baffles 381 connected with each other.

In actual operation of the invention, the oil cylinder component and the drive wheel component are driven by the manpower handle seat component to turn in synchronization. The oil cylinder component rotates in the annular sleeve of the supporting seat component, so that the entire height of the steering drive component includes the height of oil cylinder body and that of drive component. Consequently, the holistic center of gravity of the pullet truck is lowered and the pullet truck turns more smoothly and has a higher degree of integration.

In the prior art, the battery unit is mounted within the frame in most electric pullet trucks, and is located at the bottom of the frame for saving spatial efficiency, while the opening of the frame is usually disposed at the upper part of the frame, resulting that other parts above the battery unit shall be removed firstly to take the battery unit when the battery unit is to be removed or replaced. The entire frame has an unreasonable layout and is inconvenient in later maintenance. To this end, this invention further provides a frame for the electric pullet truck in which the battery unit could be conveniently removed and replaced.

The technical solution of the invention will be further illustrated in more details in connection with FIGS. 6-8 below.

Figure 6:
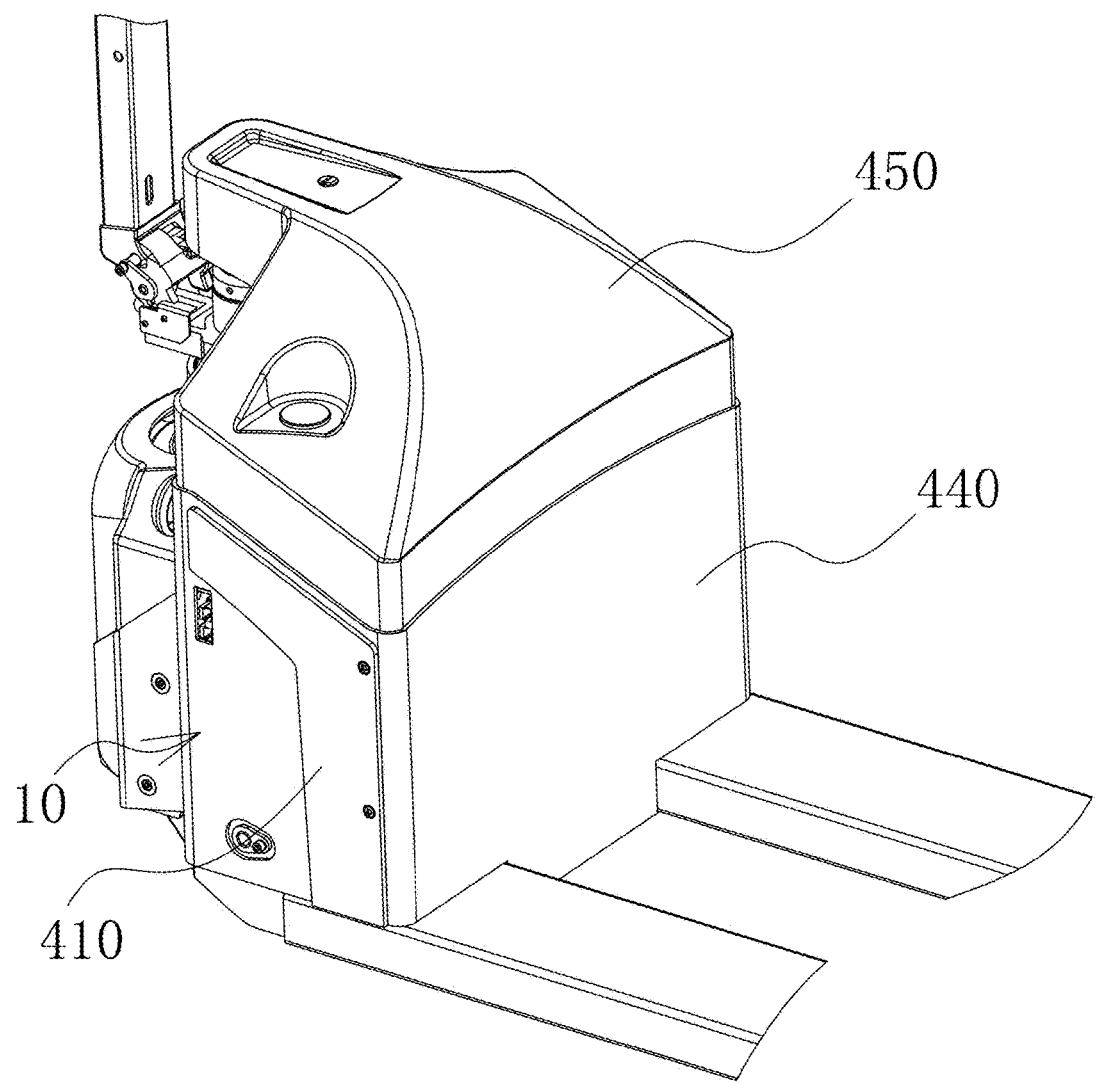
FIG. 6 is a partial diagram of the electric pullet truck according to another preferred embodiment of the invention.
Figure 7:
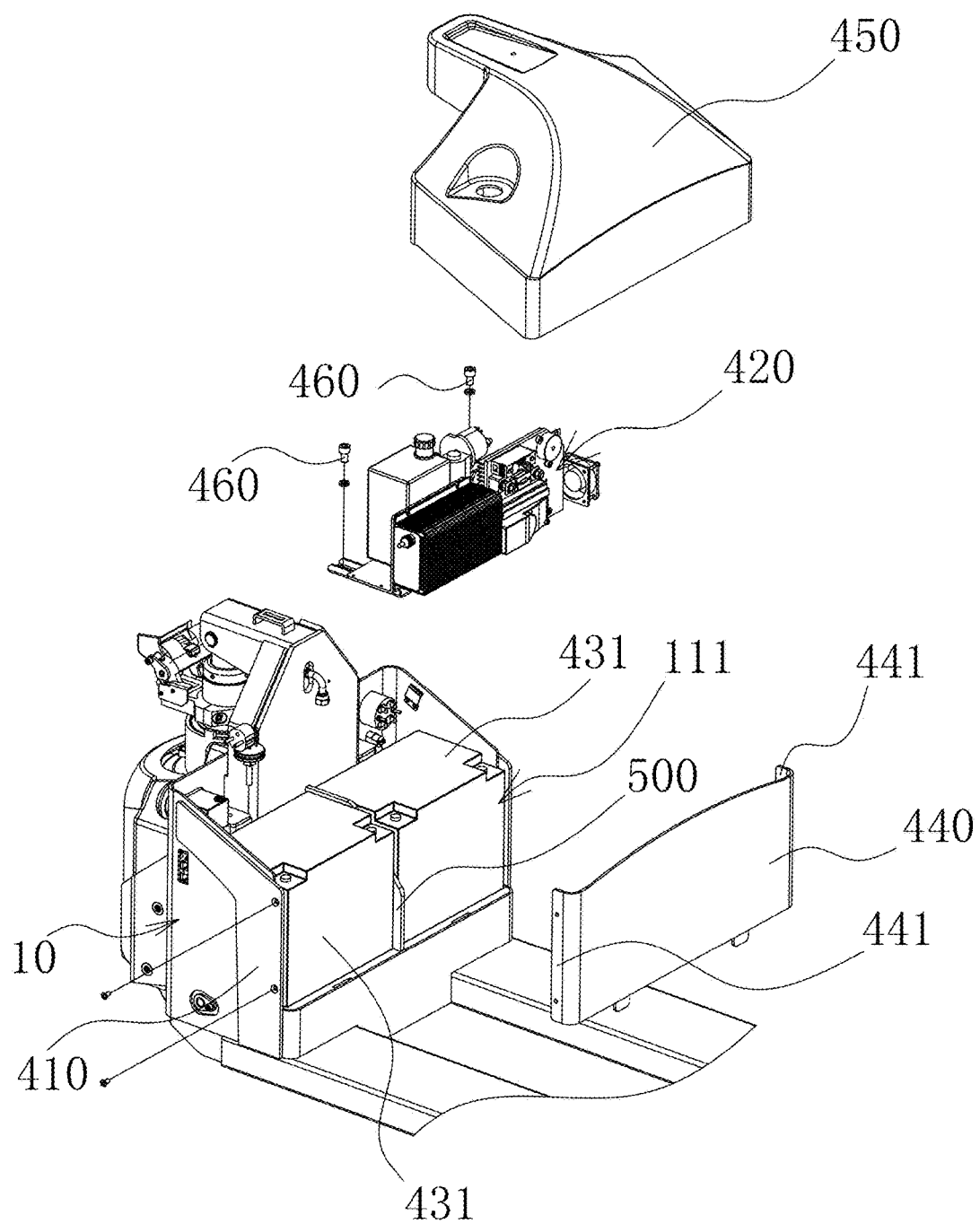
FIG. 7 is an exploded view of FIG. 6.
Figure 8:
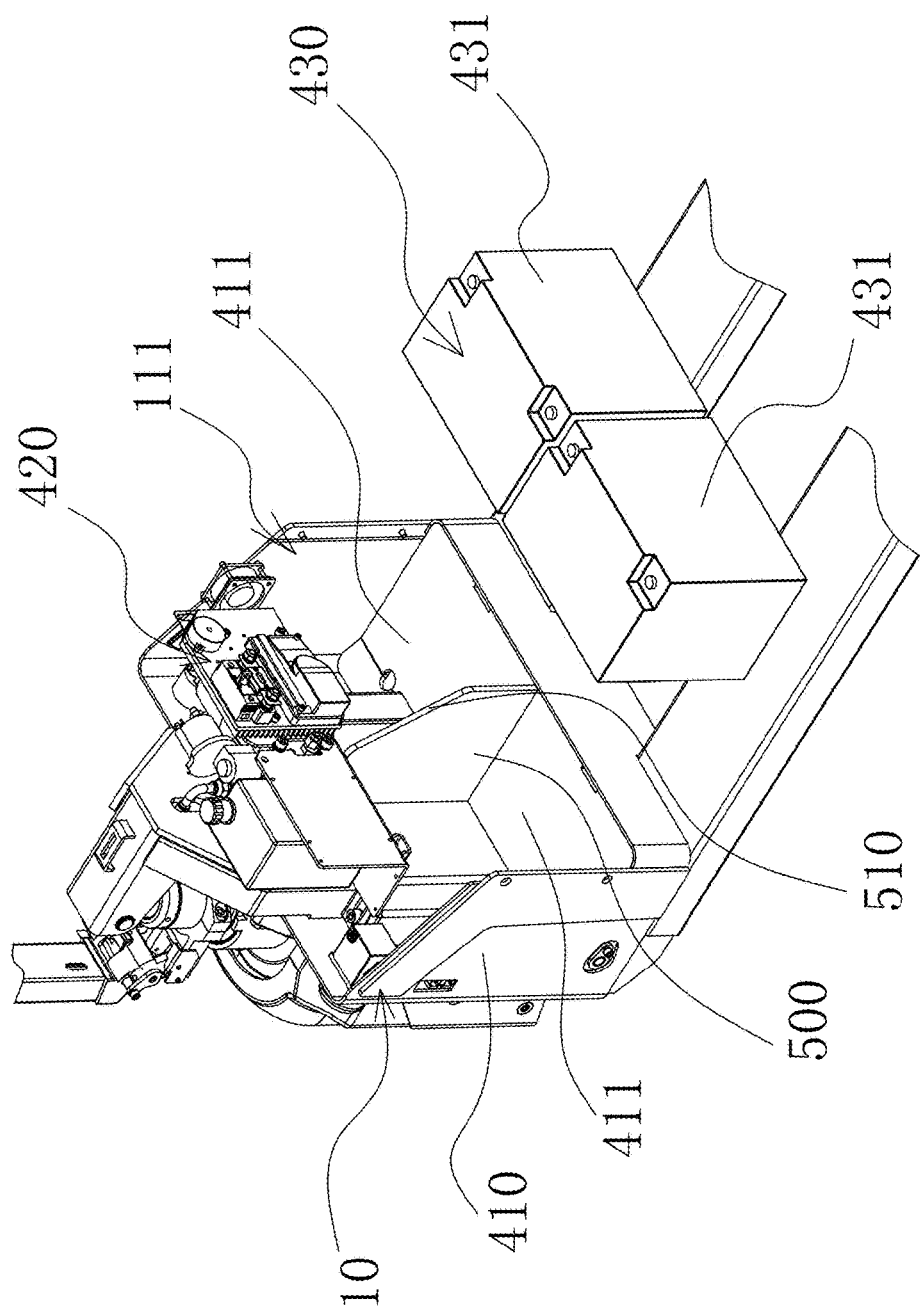
FIG. 8 is a partial exploded view of FIG. 6.

As shown in FIGS. 6-8, the frame 10 is used as a mounting base, and a battery unit port 111 is provided on its surface. In this invention, the frame surface refers to an end of the frame facing the forks, and this end is connected with the fork root. The vehicle control assembly 420 is mounted at the upper part of the frame 10. The battery unit component 430 is located within the frame 10 and below the vehicle control assembly 420. The battery unit component 430 includes at least one battery unit 431. The cover plate 440 is removably mounted on the surface of the frame 10 and seals the battery unit port 111. The cover plate 440 is located in front of the battery unit component 430. The cover plate 440 is opened to take the battery unit 431 from the battery unit port 111 directly.

The invention relates to a frame structure for an electric pullet truck which is used as the base of the electric pullet truck. The frame structure includes a frame 10, a vehicle control assembly 420, a battery unit component 430 and a cover plate4440. The vehicle control assembly is used as a combining structure of electric parts and hydraulic parts.

In this invention, the said battery unit port 111 is preferably located on the face of the frame 10 facing the forks and or the side of the frame 10, to make the operation more convenient.

In the conventional pullet trucks, the battery unit port 111 is located at the upper part of the frame 10, i.e., above the vehicle control assembly 420. In this case, the parts above the battery unit 431, like the vehicle control assembly 420, have to be removed to take the battery unit 431 out when the battery unit 431 is to be replaced, removed or maintained, for which the operate is complicated and the operation efficiency is low.

In this patent, the vehicle control assembly 420 and the battery unit component 430 are tightly mounted within the frame 10. The cover plate 440 is tightly mounted on the surface of the frame 10. As such, the entire frame has a compact structure. When the battery unit 431 is to be removed or replaced, the cover plate 440 is removed to take the battery unit 431 out of the battery unit port 111 directly, and there is no need to remove the vehicle control assembly 420 above the battery unit 431. Consequently, the battery unit 431 could be conveniently removed and replaced, the work efficiency could be guaranteed, and the utility of the pullet truck is improved and the operation is simple.

In this invention, the vehicle control assembly 420 could be used as a mounting structure or combining structure of electric parts and hydraulic parts, and as a compressing structure for mounting of the battery unit 431. Therefore, in a preferred embodiment, the lower end of the vehicle control assembly 420 is pressed against the battery unit component 430 to press each battery unit 431 within the frame 10. Such a configuration makes operation of the battery unit 431 stable, and guarantees structural stability of the entire frame of the electric pullet truck, stability of movement of the electric pullet truck and operation reliability.

In a further preferred embodiment, the vehicle control assembly 420 presses the battery units 431 of the battery unit component 430 within the frame 10 through the compression structure. One of the examples of the compression structure is described below. The compression structure is at least one compression screw 460 used to mount the vehicle control assembly 420 on the frame 10. The compression screw 460 limits the position of the vehicle control assembly 420 in the vertical direction, and could be operated to move the vehicle control assembly 420 up or down.

Thanks to this preferred compression structure, the battery units 431 are replaced as follows in this invention. The cover plate 440 is removed and the compression screw 460 is loosened, so that the battery units 431 would not be pressed by the vehicle control assembly 420. The tooling screw on the battery units 431 is then removed to take the used battery unit 431 out. And then the new battery unit 431 could be placed in the frame 10.

In order to make the internal structure of the frame more compact and to improve operation stability and firmness of fixed connection, the frame 10 preferably includes a frame enclosure 410. The vehicle control assembly 420 is tightly inserted at the upper portion of the frame enclosure 410. The battery unit component 430 is tightly provided at the lower portion of the frame enclosure 410, and the battery units 431 are entirely wrapped by the frame enclosure 410. The battery unit port 111 is located on the surface of the frame enclosure 410.

Preferably, a casing 450 is covered on the frame enclosure 410 to enclose the vehicle control assembly 420. The casing 450, the cover plate 440 and the frame enclosure 410 are close to each other tightly to form a sealed space. The casing 450 is provided to achieve anti-dust and de-noising effects on the other hand, and to be tightly connected with the cover plate 440 and the frame 10, so that the entire frame structure is fixed and reliable and internal parts would not tend to sway or displace.

Furthermore, the lower edge of the casing 450 is embedded into the area enclosed by the frame enclosure 410 and the cover plate 440 together, and the outer sidewall of the embedding part of the casing 450 is pressed against the corresponding inner wall of the enclosure 410 and cover plate 440. That is to say, the lower end of the casing 450 is tightly embedded into the frame enclosure 410, and pressed against the frame enclosure 410 and cover plate 440, for which these three could be connected more reliably and stably.

Moreover, in order for the casing 450 to be mounted more smoothly to reduce wear and scratches and to provide the entire frame with a more aesthetic appearance, the upper edge of the cover plate 440 is preferably in an arc shape and the inner wall of this arc-shape structure is pressed against the casing 450.

In this invention, in order for the frame structure to be more tightly connected and to guarantee firmness in mounting and stability in operation, both sides of the cover plate 440 are preferably bent to form hemmings 441. Each hemming 441 is tightly mounted on the inner side of the frame enclosure 410. The cover plate 440 presses the battery units 431 within the frame enclosure 410. The aforesaid vehicle control assembly 420 presses the battery units 431 on the frame 10 in the vertical direction, and the cover plate 440 presses the battery units 431 on the frame 10 in the horizontal direction. And the frame enclosure 410 is half sealed. Such a configuration makes mounting of the battery units 431 more reliable.

In a preferred embodiment of the invention two battery units 431 are provided for the battery unit component 430. The upper end faces of these two battery units 431 are in flush with each other, and enclose to form a square. Both battery units 431 are pressed within the frame 10 by the vehicle control assembly. Such a structure is compact and could meet actual demands. The entire device is flat and the center of gravity of the frame is concentrated in the central part. To this end, the electric pullet truck could move more smoothly.

In this invention, in order to improve convenience in mounting and removal, the lower part of the frame enclosure 410 is preferably provided with housing slots 411 corresponding to the battery units 431 respectively, and a separation plate 500 is located between every two adjacent battery units 431, and the separation plate 500 is integrated with the frame enclosure 410.

In a further embodiment, the upper end of the separation plate 500 is provided with a notch 510 at the corner adjacent to the cover plate 440, for which not only the battery units 431 could be conveniently mounted and removed, but also a possible wear brought by an acute corner to the cover plate 440 and vehicle control assembly 420 could be prevented.

The specific embodiments described herein are merely illustrative of the spirit of the invention. It is apparent to those skilled in the art that various modifications, amendments and alternatives can be made to these embodiments without departing from the spirit or scope defined by the appended claims.

What is claimed is:

1. An electric pullet truck, comprising:
   a frame including two forks;
   a steering drive assembly including
      a drive wheel component disposed behind the frame;
      an oil cylinder component to drive the forks up, which includes a cylinder body and a plunger which could telescopically move within the cylinder body, wherein the cylinder body is fixedly connected with the drive wheel component;
      a supporting seat component including an annular sleeve and two support arms extending from both sides of the annular sleeve, wherein the annular sleeve covers an outside of a lower portion of the cylinder body; the said two support arms are located on both sides of the drive wheel component; each of the said two support arms is provided with an equilibrium wheel at its bottom; and
      a handle seat component fixedly connected with an upper portion of the oil cylinder component.

2. The electric pullet truck as claimed in claim 1, characterized in that, the frame further includes a front casing vertical to the forks, an upper cover provided on the front casing and a back housing assembly enclosing a back of the steering drive assembly.

3. The electric pullet truck as claimed in claim 2, characterized in that, the electric pullet truck further includes a vehicle control assembly which is mounted within a space enclosed by the front casing and the upper cover.

4. The electric pullet truck as claimed in claim 3, characterized in that, an oil pipe connecting port is provided at an upper end of the plunger, and the oil pipe connecting port is in communication with the vehicle control assembly via the oil pipe.

5. The electric pullet truck as claimed in claim 1, characterized in that, a support sleeve is provided on an inner side of a bottom of each of the said two support arms, a universal wheel stand is provided within the support sleeve, the universal wheel stand is coupled with a bearing and a spring on its upper side and the equilibrium wheel is provided below the universal wheel stand.

6. The electric pullet truck as claimed in claim 1, characterized in that, the drive wheel component includes a drive wheel and a drive motor, the drive motor is fixedly connected with a lower part of the cylinder body, and the drive motor is provided above the drive wheel.

7. The electric pullet truck as claimed in claim 6, characterized in that, the drive motor is integrally provided with a first mounting panel at its upper portion and with a second mounting panel at its lower portion, and the first mounting panel and the second mounting panel are flatly connected with and fixed to each other.

8. The electric pullet truck as claimed in claim 6, characterized in that, the drive wheel is vertically disposed, the drive motor is horizontally provided above the drive wheel along its central axis, and a central line of the drive motor in the vertical direction is close to or overlapped with that of the drive wheel in the vertical direction.

9. The electric pullet truck as claimed in claim 1, characterized in that, a bearing component and a retainer ring are further provided between the annular sleeve and the cylinder body, so that the cylinder body could rotate within the annular sleeve.

10. The electric pullet truck as claimed in claim 1, characterized in that, the electric pullet truck further includes an annular baffle provided below the annular sleeve and the diameter of the annular baffle is larger than that of the annular sleeve to cover the drive wheel component.

11. The electric pullet truck as claimed in claim 1, characterized in that, a battery unit port is provided on a surface of the frame, a vehicle control assembly is mounted at an upper part of the frame, the electric pullet truck further comprises:
   a battery unit component provided within the frame and below the vehicle control assembly, wherein the battery unit component includes at least one battery unit; and
   a cover plate removably mounted on a surface of the frame to seal the battery unit port, wherein the cover plate is located in front of the battery unit component, and the battery unit could be directly taken out from the battery unit port when the cover plate is opened.

12. The electric pullet truck as claimed in claim 11, characterized in that, a lower end of the vehicle control assembly is pressed against the battery unit component to press each battery unit within the frame tightly.

13. The electric pullet truck as claimed in claim 12, characterized in that, two battery units are provided for the battery unit component, the upper end faces of said two battery units are flush with each other, and said two battery units are both pressed within the frame by the vehicle control assembly.

14. The electric pullet truck as claimed in claim 11, characterized in that, the frame includes a frame enclosure, the vehicle control assembly is tightly inserted at an upper portion of the frame enclosure, the battery unit component is tightly provided at a lower portion of the frame enclosure, the battery unit component is entirely wrapped by the frame enclosure, and the battery unit port is located on a surface of the frame enclosure.

15. The electric pullet truck as claimed in claim 14, characterized in that, a casing is provided on the frame enclosure to enclose the vehicle control assembly, and the casing, cover plate and frame enclosure are closely adjacent to form a sealed space.

16. The electric pullet truck as claimed in claim 15, characterized in that, a lower edge of the casing is embedded into an area enclosed by the frame enclosure and the cover plate together, and an outer sidewall of the embedding part of the casing is pressed against a corresponding inner wall of the frame enclosure and cover plate.

17. The electric pullet truck as claimed in claim 16, characterized in that, an upper edge of the cover plate is in an arc shape and an inner wall of this arc-shape structure is pressed against an outer wall of the casing.

18. The electric pullet truck as claimed in claim 14, characterized in that, both sides of the cover plate are bent to form hemming, and each of the hemmings is tightly mounted on an inner side of the frame enclosure.

\* \* \* \* \*